United States Patent
Heil et al.

(10) Patent No.: US 11,496,850 B2
(45) Date of Patent: Nov. 8, 2022

(54) SPATIAL ARRANGEMENT OF SOUND BROADCASTING DEVICES

(71) Applicant: L-ACOUSTICS, Marcoussis (FR)

(72) Inventors: Christian Heil, London (GB); Florent Bernard, Saint Arnoult en Yvelines (FR); Christophe Combet, Antony (FR); Etienne Corteel, Malakoff (FR)

(73) Assignee: L-ACOUSTICS, Marcoussis (FR)

( * ) Notice: Subject to any disclaimer, the term of this patent is extended or adjusted under 35 U.S.C. 154(b) by 0 days.

(21) Appl. No.: 16/758,747

(22) PCT Filed: Oct. 23, 2018

(86) PCT No.: PCT/FR2018/052636
§ 371 (c)(1),
(2) Date: Jun. 4, 2020

(87) PCT Pub. No.: WO2019/081848
PCT Pub. Date: May 2, 2019

(65) Prior Publication Data
US 2021/0006917 A1    Jan. 7, 2021

(30) Foreign Application Priority Data
Oct. 23, 2017   (FR) ...................................... 1760006

(51) Int. Cl.
*H04S 7/00* (2006.01)
*H04R 1/28* (2006.01)

(52) U.S. Cl.
CPC ............. *H04S 7/30* (2013.01); *H04R 1/2819* (2013.01)

(58) Field of Classification Search
CPC ........ H04R 1/2819; H04R 5/02; H04R 1/026; H04R 1/26; H04R 1/323; H04R 1/403; H04R 27/00; H04S 7/30
See application file for complete search history.

(56) References Cited

U.S. PATENT DOCUMENTS

| | | | | |
|---|---|---|---|---|
| 4,612,665 A | * | 9/1986 | Inami | ................. H03G 5/025 324/76.31 |
| 5,163,167 A | | 11/1992 | Heil | |

(Continued)

FOREIGN PATENT DOCUMENTS

| | | |
|---|---|---|
| EP | 1635606 A1 | 3/2006 |
| FR | 2364585 A1 | 4/1978 |

OTHER PUBLICATIONS

International Search Report and Written Opinion for PCT/FR2018/052636 dated Jan. 29, 2019.

(Continued)

*Primary Examiner* — Jason R Kurr
(74) *Attorney, Agent, or Firm* — Patterson Thuente Pedersen, P.A.

(57) ABSTRACT

The present invention relates to a spatial arrangement for optimizing the broadcasting of a sound signal and thus replacing the conventional stereo systems. For this purpose, the spatial arrangement is capable of broadcasting a spatialized sound signal, the spatialized sound signal comprising N mutually distinct audio signals, N being an integer strictly greater than 3, and the spatial arrangement comprising a set of N sound broadcasting devices predominantly distributed over the entire width of a scene. Each sound broadcasting device receives an audio signal of which it will amplify and broadcast the transmitted sound. In particular, each sound broadcasting device is specifically capable of reproducing and preserving the characteristics of the sound transmitted by the audio signal received, in particular the sound frequency bands and the sound intensity of the frequency bands of the audio signal.

15 Claims, 11 Drawing Sheets

(56) References Cited

U.S. PATENT DOCUMENTS

| | | | | |
|---|---|---|---|---|
| 7,298,860 | B2* | 11/2007 | Engebretson | H04R 1/026 |
| | | | | 381/335 |
| 9,179,236 | B2* | 11/2015 | Robinson | H04S 3/008 |
| 10,261,519 | B2* | 4/2019 | Di Censo | H04S 7/302 |
| 10,375,468 | B2* | 8/2019 | Spillmann | H04R 1/18 |
| 2004/0218773 | A1* | 11/2004 | Andrews | H04R 1/403 |
| | | | | 381/335 |
| 2008/0212805 | A1 | 9/2008 | Fincham | |
| 2009/0214067 | A1 | 8/2009 | Bothe | |
| 2011/0096947 | A1 | 4/2011 | Oxford et al. | |
| 2012/0014544 | A1 | 1/2012 | Gladwin et al. | |
| 2017/0251296 | A1 | 8/2017 | Smithers | |
| 2020/0068296 | A1 | 2/2020 | Heil et al. | |

OTHER PUBLICATIONS

DASAudioSpain: "Ease Focus V2" YouTube. May 10, 2012. www.youtube.com/watch?y=G5nA01Aze-k.

Brown, "Systems for Stereophonic Sound Reinforcement: Performance Criteria, Design Techniques and Practical Examples". 113$^{th}$ AES Convention. Oct. 8, 2002.

AFMG Ahnert Feistel Media Group: "Focus Your Sub Arrays!", Prolight and Sound. Apr. 7, 2017.

AFMG Ahnert Feistel Media Group: "Ease Focus Version 2", Mar. 31, 2014. www.vueaudio.com/vue-package/ease-focus-2-5.manual-pdf/?wpdmdl=4679&ind=0.

International Search Report and Written Opinion for PCT/FR2018/050060, dated Apr. 17, 2018, 14 pages.

* cited by examiner

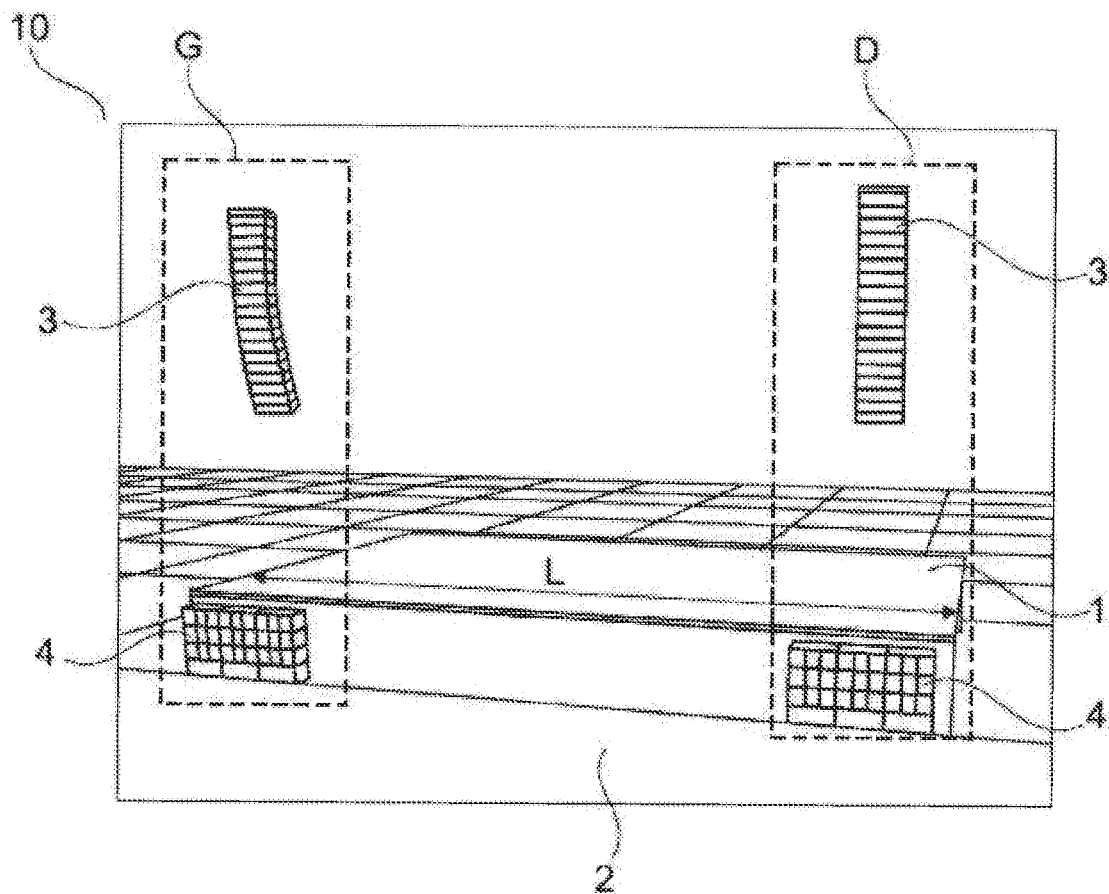
Fig. 1a — Prior Art
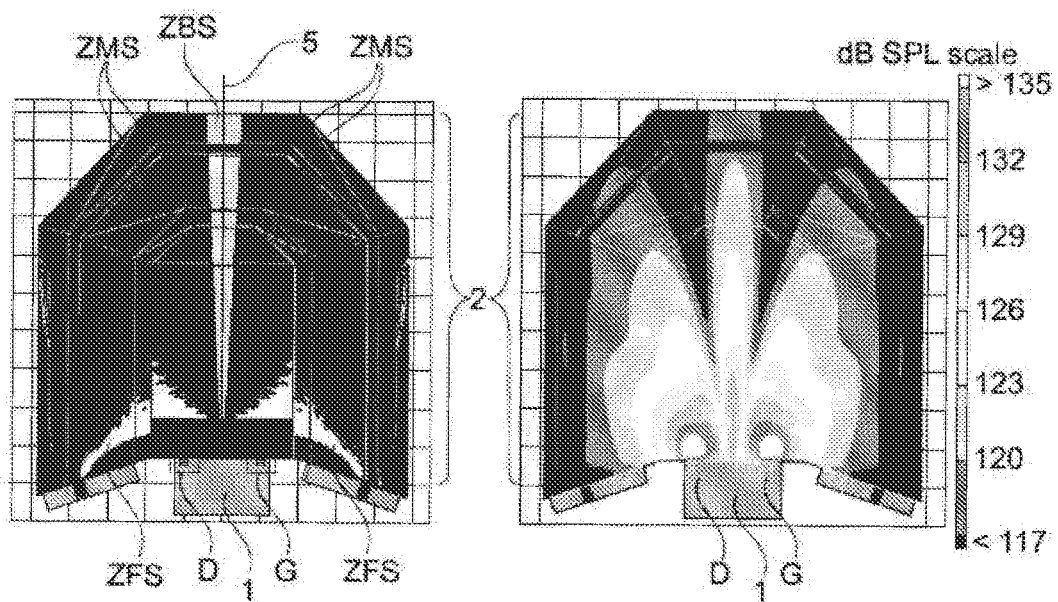
Fig. 1b — Prior Art   Fig. 1c — Prior Art

SPATIAL ARRANGEMENT OF SOUND BROADCASTING DEVICES

RELATED APPLICATIONS

This present application is a National Phase entry of PCT Application No. PCT/FR2018/052636 filed Oct. 23, 2018 which claims priority to French Application No. 1760006 filed Oct. 23, 2017 the contents of each being incorporated herein by reference in their entireties.

TECHNICAL FIELD

The present invention relates to a spatial arrangement of sound broadcasting devices for a performance stage such as the stage of a concert hall or of an open-air festival.

BACKGROUND

Nowadays, the concert public address system is carried out mainly by two raised broadcasting points, arranged to the left and to the right of the stage edge. FIG. 1a shows such a stereo arrangement 10.

In the example, a vertical stack 3 of M loudspeaker enclosures is arranged to the left G of the stage 1 and the same stack 3 is arranged to the right of the stage 1, M being an integer greater than or equal to 1. In the present case, the vertical groups of loudspeaker enclosures are suspended to the left G and to the right D of the stage 1 while remaining globally in the width L of the stage.

The stereo arrangement 10 also comprises two identical sets 4 of sub-bass enclosures, one arranged to the left G and the other to the right D of the stage edge below the stacks 3 of loudspeaker enclosures, each set 4 comprising a number Y of sub-bass enclosures, Y being an integer greater than or equal to 1.

The sets of sub-bass enclosures 4 may be raised or placed on the floor, or even distributed along a line colinear with the stage 1, on the floor where the audience 2 is located.

The stereo arrangement 10 such as described by FIG. 1a is capable of broadcasting two identical or different audio signals.

When the two signals broadcast by the stereo arrangement 10 are identical in content and in intensity, the equivalent source is then perceived at the middle, between the two stacks 3 of loudspeaker enclosures, in the event that the listener is positioned on the perpendicular bisector of the line formed by the two left G and right D broadcasting points.

For the audience located on this line the sources may in addition be spatialized by playing on the relative intensity of the signal injected into the two stacks 3 of loudspeaker enclosures.

Spatialization is to be understood as the fact of being able to locate, in the space, the area of emission of a specific sound such as same emitted by a musical instrument located on the stage 1. In the case of a sound source whereof the emission is picked up, amplified then reproduced by an arrangement of sound devices, we speak of "good spatialization" when there is a concordance between the area of the space where the sound source is located and the area of the space where the listener perceives the sound emission of the same source.

The intensity stereophony makes it possible to modify the spatialization of the source by varying the intensity of the signal broadcast by the left stack 3 and/or the intensity of the signal broadcast by the right stack 3. The equivalent source may then be spatialized between the two stacks 3 of loudspeaker enclosures. However, the spatialization operates correctly for the listeners located on the perpendicular bisector. For the listeners located outside of the perpendicular bisector, the spatialization is bad.

The use of two audio signals identical in content (source placed at the center for example) reproduced by the two left and right stacks 3 of loudspeaker enclosures generates interferences that can be perceived as soon as the listener is not on the perpendicular bisector. The interferences have for effect of significantly degrading the quality of reproduction and above all the intelligibility of the message to be reproduced. In this case the engineer of the sound will naturally avoid the superposition of areas of coverage of the two stacks 3 of loudspeaker enclosures in order to limit the extent of the interferences.

When the two audio signals broadcast are different in content, the phenomenon of interferences is much less pronounced and it is also possible to spatialize two sources in two different points. As the interferences are no longer a problem (in the extreme case where each stack 3 of loudspeaker enclosures reproduces a specific audio signal), the engineer of the sound will try to maximize the common coverage area of the two stacks 3 of loudspeaker enclosures so that the listeners can hear both the audio signal broadcast by the stack 3 located to the right and the audio signal broadcast by the stack 3 located to the left. The listeners positioned outside of the common coverage area will not hear the two audio signals but one or other of the audio signals broadcast by the left and right stacks 3 of loudspeaker enclosures.

Therefore, it can be seen that there is a contradiction with the recommendation made in the case of identical audio signals.

Therefore, it seems impossible to combine good spatialization and intelligibility of the audio signals spatialized for the entire audience with a stereo arrangement 10.

FIG. 1b shows a top view of a performance hall equipped with the stereo arrangement 10 of FIG. 1a broadcasting an identical audio signal to the left and to the right of the stage 1. In FIG. 1b, the quality of the spatialization of the sound is shown in light grey for the area of good spatialization ZBS corresponding to the area close to the perpendicular bisector 5, in dark grey for the area where the quality of the spatialization is average ZMS and in white the area where the quality is poor ZFS and where the listener does not perceive all of the stacks 3 of loudspeaker enclosures.

FIG. 1c shows the sound level generated by the left G and right D sound broadcasting points of the stereo arrangement 10 illustrated in FIG. 1a, over a frequency range from 20 Hz to 63 Hz. It is also observed on the FIG. the typical losses of sound level of an interferential area. The sound quality is significantly degraded.

The concert public address is intended to reproduce as best as possible the musical content for a large audience 2 whereof the listeners are mostly placed outside of the perpendicular bisector 5. Based on this observation, the multichannel public address system starts to be adopted which consists of replacing the two left G and right D broadcasting points with a set of identical (in technical features and in quantities of enclosures) broadcasting points distributed collinearly with the stage.

The layout enables the engineer of the sound to position the audio signals representing the spatialized sound sources in the broadcasting points that are the closest thereto. Therefore, we speak of spatialized audio signals.

If the audience 2 is in the common coverage of the broadcasting points, the difficulties explained above are resolved. Consequently, it will be sought to maximize the common coverage area of the broadcasting points for the multichannel public address system.

Indeed each source may be reproduced by a single broadcasting point located as close as possible thereto. Consequently, the sound is emitted coherently with the physical position of the source, it is that a good location is obtained. Finally, the reproduction being predominantly made from a broadcasting point, the quality of the sound is optimum since free of interferences.

However, the configuration is not optimum as soon as this involves reproducing dynamic, powerful modern music and having a spectral content loaded in the bass.

In particular, it seems unreasonable, as much for questions of budgetary order as for obstruction of the vision of the stage, to place as many loudspeaker enclosures in each multichannel broadcasting point as what was done in left/right configuration.

Therefore, there is a real need to take into account the requirements associated with the spatialization of the music in public address systems like the various types of instruments and the specificities thereof, the density of the instruments, etc. overcoming the defects, drawbacks and obstacles of the prior art, particularly of a spatial arrangement for controlling the various parameters.

SUMMARY

To resolve one or more of the previously mentioned drawbacks, embodiments of the invention relates to a spatial arrangement of sound broadcasting devices for a stage, the spatial arrangement being capable of broadcasting a spatialized sound signal, the spatialized sound signal comprising N mutually distinct audio signals, N being an integer strictly greater than 3, the spatial arrangement comprising a set of N sound broadcasting devices predominantly distributed over the entire width of the stage, each sound broadcasting device receiving an audio signal, the sound broadcasting devices being capable of amplifying and broadcasting the audio signals, characterized in that each sound broadcasting device is specifically capable of reproducing and preserving the characteristics of the audio signal received in particular the sound frequency bands, and the sound intensity of the frequency bands of the audio signal.

Advantageously, the sound broadcasting devices are at least of two different types due to the acoustic features thereof, and it is defined at least one central area of the stage, and at least two lateral areas, the central area comprising at least two sound broadcasting devices according to a first type and each of the lateral areas comprising at least one sound broadcasting device according to a second type.

To limit the visual impression of the sound broadcasting devices in the edge of the stage, and to avoid exposing the people the closest to the stage to too high sound pressure levels, the sound broadcasting devices are globally aligned with the edge of the stage and located above the stage, generally by being mounted on the standard load-bearing structures used in the concert halls.

Specific features or embodiments, that can be used alone or in combination, are:

the spatial arrangement further comprises a third type of sound broadcasting devices, the third type of sound broadcasting devices being capable of broadcasting the basses and infra-basses of the sounds transmitted by the audio signal or the audio signals received by the broadcasting devices of the third type.

the broadcasting devices of the third type are located in the central area;

the spatial arrangement comprises:

X sound broadcasting devices of the first type in the central area comprising a quantity less than or equal to 2M/X loudspeaker enclosures, X being an integer greater than or equal to 2, in the aim of replacing a stereo arrangement comprising a first vertical stack of M loudspeaker enclosures to the left of the stage and a second vertical stack of M loudspeaker enclosures to the right of the stage identical to the first stack, M being an integer greater than or equal to 1; or X sound broadcasting devices of the first type in the central area comprising a quantity less than or equal to 2M/X loudspeaker enclosures, X being an integer greater than or equal to 2, as well as a number less than or equal to 2Y of sub-bass loudspeaker enclosures in order to constitute the sound broadcasting devices of third type in the aim of replacing a stereo arrangement comprising a first vertical stack of M loudspeaker enclosures to the left of the stage and, a second vertical stack of M loudspeaker enclosures to the right of the stage identical to the first stack and two identical sets each comprising Y sub-bass loudspeaker enclosures, one of the sets being arranged to the left of the stage and the other set to the right, M and Y being two integers greater than or equal to 1.

the sound broadcasting devices of the second type deliver an intrinsic maximum sound power less than or equal to same of the sound broadcasting devices of the first type in the medium/acute bands; and/or the sound broadcasting devices of the second type deliver an intrinsic maximum sound power less than or equal to at least 2 dB in relation to same of the sound broadcasting devices of the first type in the band of low frequencies.

In a second aspect, embodiments of the invention relate to a method for determining an optimized spatial arrangement of sound broadcasting devices for a stage in order to replace a stereo arrangement, the stereo arrangement comprising a first vertical stack of M loudspeaker enclosures to the left of the stage and a second vertical stack of M loudspeaker enclosures to the right of the stage identical to the first stack, M being an integer greater than or equal to 1, the optimized spatial arrangement comprising N sound broadcasting devices, and the spatial arrangement being capable of broadcasting a spatialized sound signal, the spatialized sound signal comprising N mutually distinct audio signals, N being an integer strictly greater than 3, the spatialized sound signal being from a sound creation process produced upstream of the broadcasting, each sound broadcasting device receiving an audio signal, the sound broadcasting devices being capable of amplifying and broadcasting the audio signals, the method comprising:

a step of selection wherein the sound broadcasting devices are selected so as to have at least two different types due to the acoustic features thereof;

a step of division of the entire width of the stage wherein it is defined at least one central area, and at least two lateral areas;

a step of installation of the sound broadcasting devices wherein a number X of sound broadcasting devices of the first type are arranged in the central area comprising a quantity less than or equal to 2M/X loudspeaker enclosures, X being an integer greater than or equal to 2, and a number N-X of sound broadcasting devices of the second type are arranged in the lateral areas.

When the stereo arrangement also comprises two identical sets each comprising Y sub-bass loudspeaker enclosures, one of the sets being arranged to the left of the stage and the other set to the right, Y being an integer greater than or equal to 1, the method is advantageously adjusted as follows:

during the step of selection, the sound broadcasting devices are selected so as to also have a third type different from the first and from the second types due to the acoustic features thereof; and during the step of installation of the sound broadcasting devices, a number less than or equal to 2Y of sub-bass loudspeaker enclosures in order to constitute the sound broadcasting devices of the third type are arranged in the central area.

BRIEF DESCRIPTION OF THE FIGURES

The invention will be better understood upon reading the following description, made only by way of example, with reference to the appended FIGS. wherein:

FIG. 1a shows a conventional stereo arrangement;

FIGS. 1b and 1c show a top view of a conventional stereo arrangement broadcasting an identical audio signal in each of the left and right stacks of loudspeaker enclosures according to FIG. 1a illustrating respectively the quality of the spatialization of the sound broadcast by the sound broadcasting points, and the sound level generated by the sound broadcasting points over a frequency range from 20 Hz to 63 Hz;

FIG. 3a shows a spatial arrangement according to a second embodiment of the invention and FIG. 3b shows the response curve in SPL (Sound Pressure Level) dB depending on the frequency of the various types of sound broadcasting devices used in the spatial arrangement of FIG. 3a;

FIG. 8a shows a stereo arrangement and FIG. 8b shows a spatial arrangement according to a fourth embodiment of the invention that aims to replace the stereo arrangement of FIG. 8a;

FIG. 9a shows a stereo arrangement and FIG. 9b shows a spatial arrangement according to an alternative of the fourth embodiment of the invention that aims to replace the stereo arrangement of FIG. 9a;

DEFINITIONS

Figure 2A:
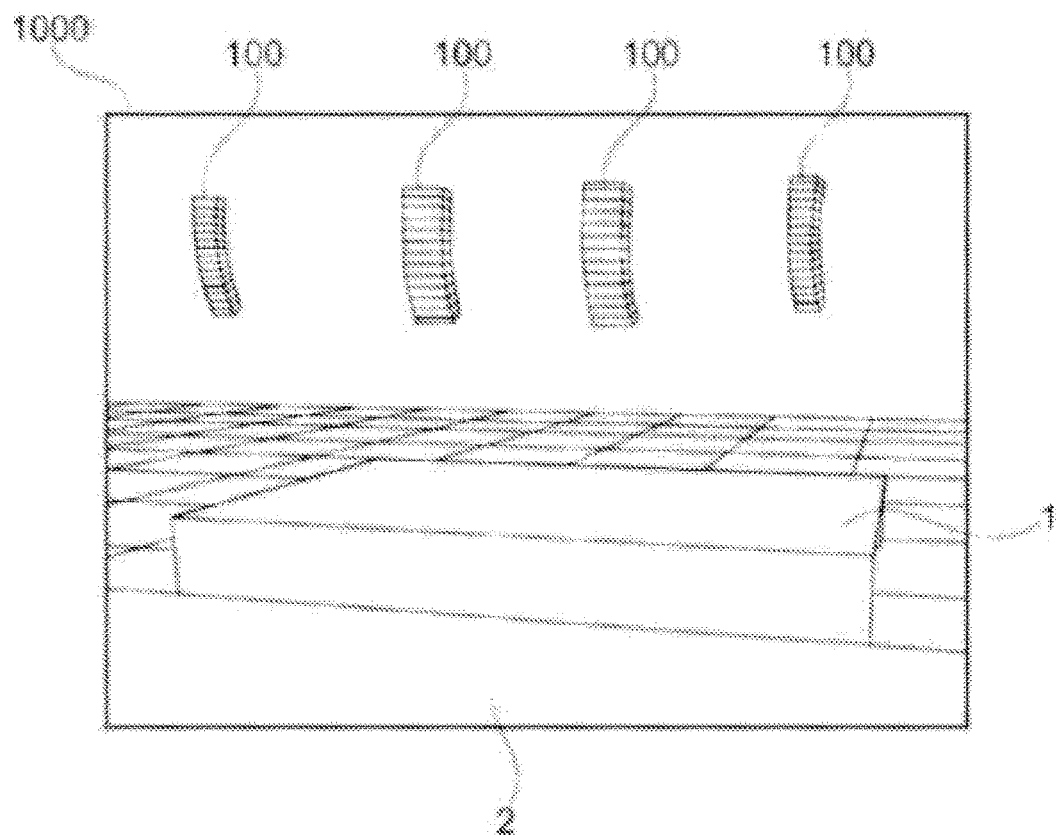
FIGS. 2a and 2b show a spatial arrangement according to a first embodiment of the invention.

For the rest of the description, the term "stage edge" designates the space defined by the surface occupied by the stage as well as the space located above the surface.

As for the term "spatialized sound signal", it corresponds to a sound signal constituted such as to reproduce a spatial impression in the listening area when the sound signal will be reproduced and broadcast.

It may be from a sound creation process upstream of the public broadcasting anticipating the physical layout of the sound broadcasting devices used during the event or else in real time from pickup devices on stage and/or recorded sounds (Live situation).

In any case, this presumes associating spatial information (azimuth, distance, elevation, width of source, etc.) with each sound thus forming a "sound source". A device (processor, computer program) then makes it possible to create the audio signals that will be transmitted to one or more broadcasting devices depending on the position thereof, on the spatialized sound signal and on the spatial information associated with each sound source.

For this, the processor/program will be based on a spatialization technique whereof examples can be given:

extension of the intensity stereophony (e.g.: Vector Based Amplitude Panning);

technique based on orthogonal solutions of the equation of the waves (e.g.: High Order Ambisonics in 3D for the spherical coordinates, in 2 dimensions for the polar coordinates);

technique based on a formulation with limits (e.g.: Wave Field Synthesis)

All of the techniques define filtering operations for modifying the signal associated with each of the sound sources in order to create the audio signals that will be transmitted to one or more sound broadcasting devices and to create the required spatial impression. Thus, an audio signal may contain the spatialized sound of a plurality of instruments that will be retransmitted by the sound broadcasting device to which the audio signal is connected.

The signals of multiple sound sources may be combined so as to recreate a spatial sound stage intended to be broadcast by a specific arrangement (position only) of the sound broadcasting devices defined during the generation of the audio signals thereof.

When it is a question of a "sound broadcasting device", same may consist of a plurality of sources or loudspeaker enclosures whereof the frequency bands or ranges may be identical or different.

A division, arbitrary, but frequently used in the profession, divides the sound spectrum, covering at least partially the audible spectrum of the human being: 20 Hz-20 kHz, into three or four frequency bands. A high frequency, HF, band covers the highest frequencies corresponding to sounds to be acute, that is to say typically a 1 kHz-20 kHz interval. A medium frequency, MF, band covers the intermediate frequencies, that is to say typically a 200 Hz-1 kHz interval. A low frequency, LF, band covers the lowest frequencies corresponding to sounds to be bass, that is to say typically a 60 Hz-200 Hz interval. Finally, a very low frequency, VLF, band corresponding to sounds to be sub-bass or infra-bass, optional covers the lowest frequencies, that is to say typically the frequencies less than 60 Hz.

Embodiments

FIG. 2a illustrates a first embodiment according to the invention of a spatial arrangement 1000 of sound broadcasting devices 100 for a stage 1.

The stage 1 may be a stage of the type of same that are found in the concert halls or during open-air festivals. Typically, the type of stage with a width between 10 m and 40 m, and a depth between 5 m and 40 m.

The spatial arrangement 1000 is capable of broadcasting a spatialized sound signal comprising N mutually distinct audio signals, that is to say different in relation to the audio information that same contain, N being an integer strictly greater than 3. As a reminder, it should be noted that the current stereo systems, like same previously illustrated in FIG. 1*a*, only comprise two audio signals, one intended for the left G broadcasting point and the other intended for the right D broadcasting point. The sub-bass devices may receive a dedicated signal.

In addition, the spatial arrangement 1000 comprises a set of N sound broadcasting devices 100 predominantly distributed over the entire width of the stage 1.

Each sound broadcasting device 100 receives an audio signal, the sound broadcasting devices 100 being capable of amplifying and broadcasting the audio signals received.

In addition, in order to take into account the specificities of the music broadcast in particular the various types of instruments, the intensity thereof and the respective frequency ranges thereof, each sound broadcasting device 100 is specifically capable of reproducing and preserving the characteristics of the audio signal or of the audio signals received in particular the sound frequency bands, and the sound intensity of the frequency bands of the sound transmitted.

Figure 2B:
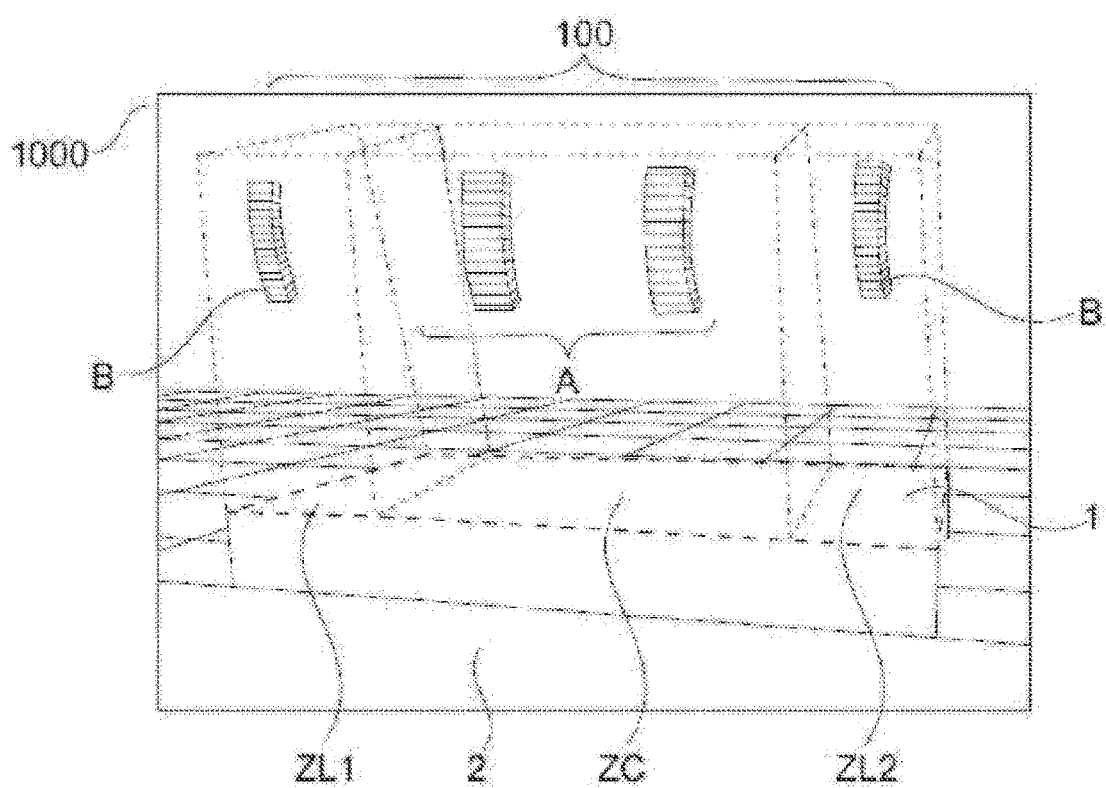

So as to be closer to conventional spatial configurations where the density of instruments is more significant at the center of the stage 1, it is advantageous that the sound broadcasting devices 100 are at least of two different types A and B due to the acoustic features thereof in particular due to the intrinsic maximum sound power thereof, and to define at least one central area ZC on the stage 1, and at least two lateral areas ZL1 and ZL2, such that the central area ZC comprises at least two sound broadcasting devices 100 according to a first type A and such that each of the lateral areas ZL1 and ZL2 comprise at least one sound broadcasting device according to a second type B, as illustrated in FIG. 2*b*.

For example, the sound broadcasting devices 100 of the second type B may deliver:

an intensity, in the meaning of intrinsic maximum sound power, less than or equal to the intensity of the sound broadcasting devices 100 of type A, in the medium/acute bands; and/or an intensity, in the meaning of intrinsic maximum sound power, less than or equal to at least 2 dB in relation to the intensity of the sound broadcasting devices 100 of type A in the band of low frequencies.

Figure 3A:
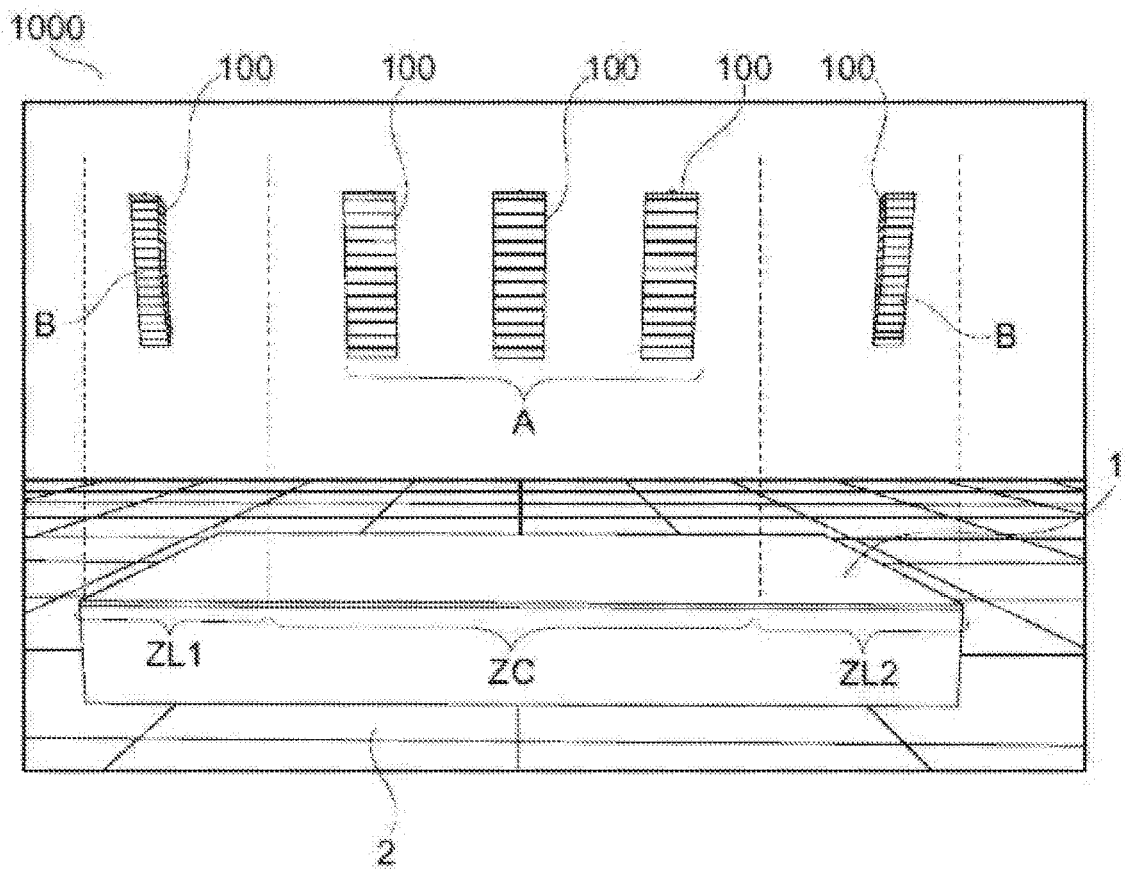

For example, FIG. 3*a* shows a spatial arrangement 1000 according to a second embodiment of the invention. Therein, three sound broadcasting devices 100 of the first type A are arranged in the central area ZC of the stage 1 and each lateral area ZL1 and ZL2 comprises a sound broadcasting device 100 of the second type B.

Figure 3B:
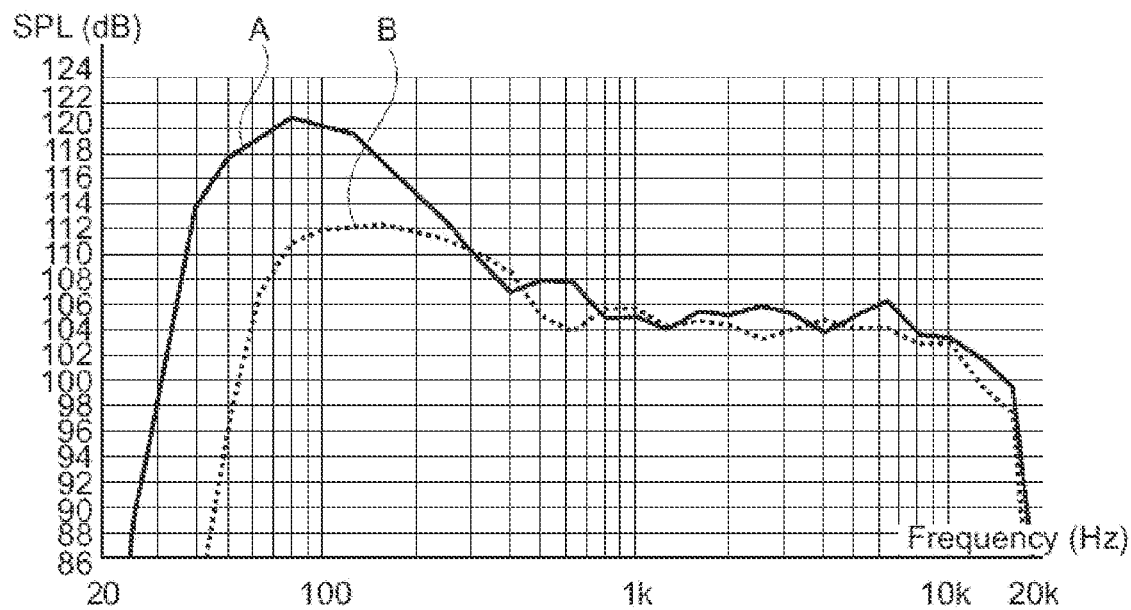

FIG. 3*b* shows the response curve in SPL (Sound Pressure Level) dB depending on the frequency of a sound broadcasting device 100 of the first type A and same of a sound broadcasting device 100 of the second type B. The sound broadcasting device 100 of type B has substantially the same benefit as the sound broadcasting device 100 of type A above 300 Hz, 8 dB of less than 100 Hz and 22 dB of less than 50 Hz, which not only translates an intensity in the lowest low frequencies but also a narrower bandwidth.

Advantageously, the sound broadcasting devices 100 are globally aligned with the edge of the stage 1 and located above the stage 1. This makes it possible on one hand to limit the visual impression of the sound devices 100 in the edge of the stage 1, but above all this makes it possible to avoid exposing the people the closest to the stage 1 to too high sound pressure levels.

Figure 4:
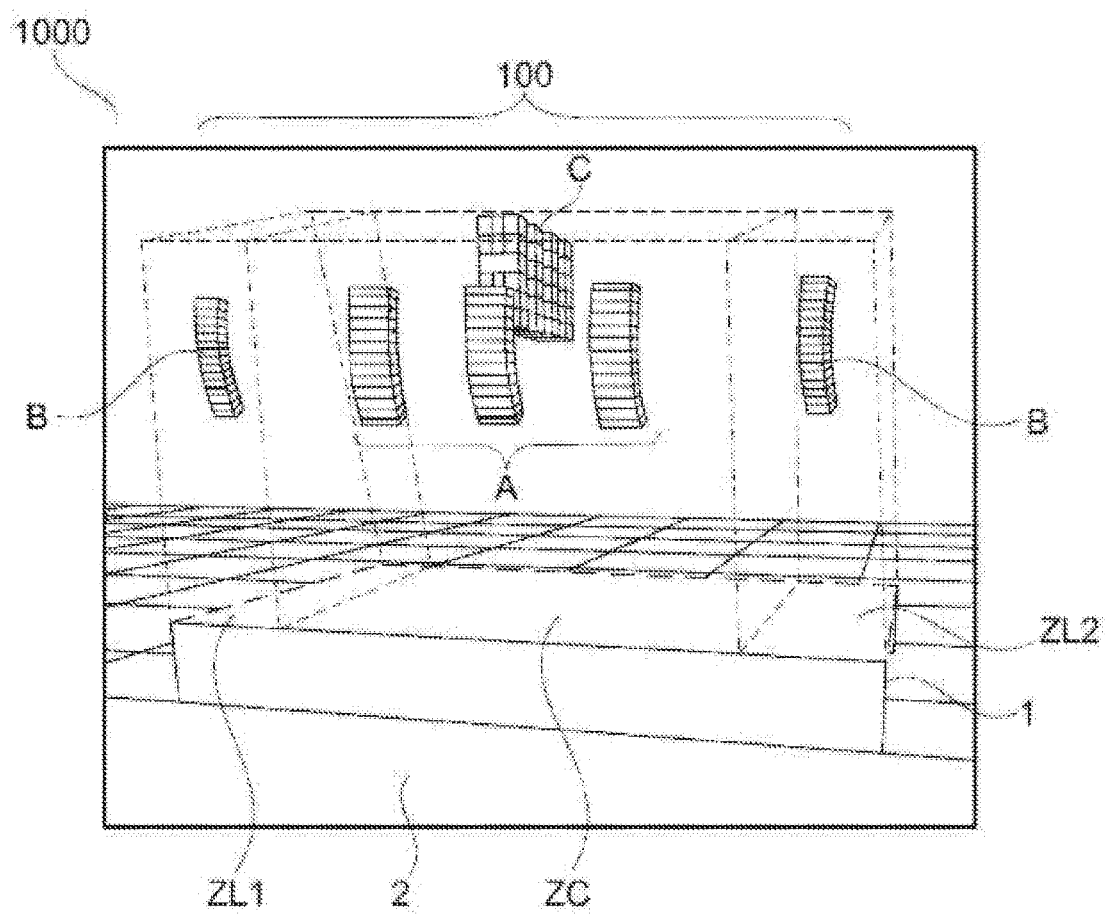
FIG. 4 shows a spatial arrangement according to a third embodiment of the invention.

FIG. 4 illustrates a third embodiment of the invention.

In the third embodiment, the spatial arrangement 1000 further comprises a third type C of sound broadcasting devices 100, different from the first and from the second types A and B. The third type C of sound broadcasting devices 100 is capable of broadcasting the basses and infra-basses of the sounds transmitted by the audio signal or the audio signals received by the broadcasting devices 100 of the third type C.

The sound broadcasting devices 100 of type C make it possible to solve the problems related to the overall inefficiency of systems for broadcasting the bass and the infra-bass in the conventional left/right systems, very strongly interfere with large disparities of level between the center (reference position, engineer of the sound) and the rest of the audience as previously illustrated in FIG. 1*c*.

Preferably, the broadcasting devices of the third type C are located in the central area ZC. Indeed, in the conventional spatial configurations the density of instruments is more significant at the center. Yet, the instruments typically require more resources, more specifically in the basses/infra-basses. The frequency content of the signals of the instruments is generally more pronounced in the bass.

Figure 5:
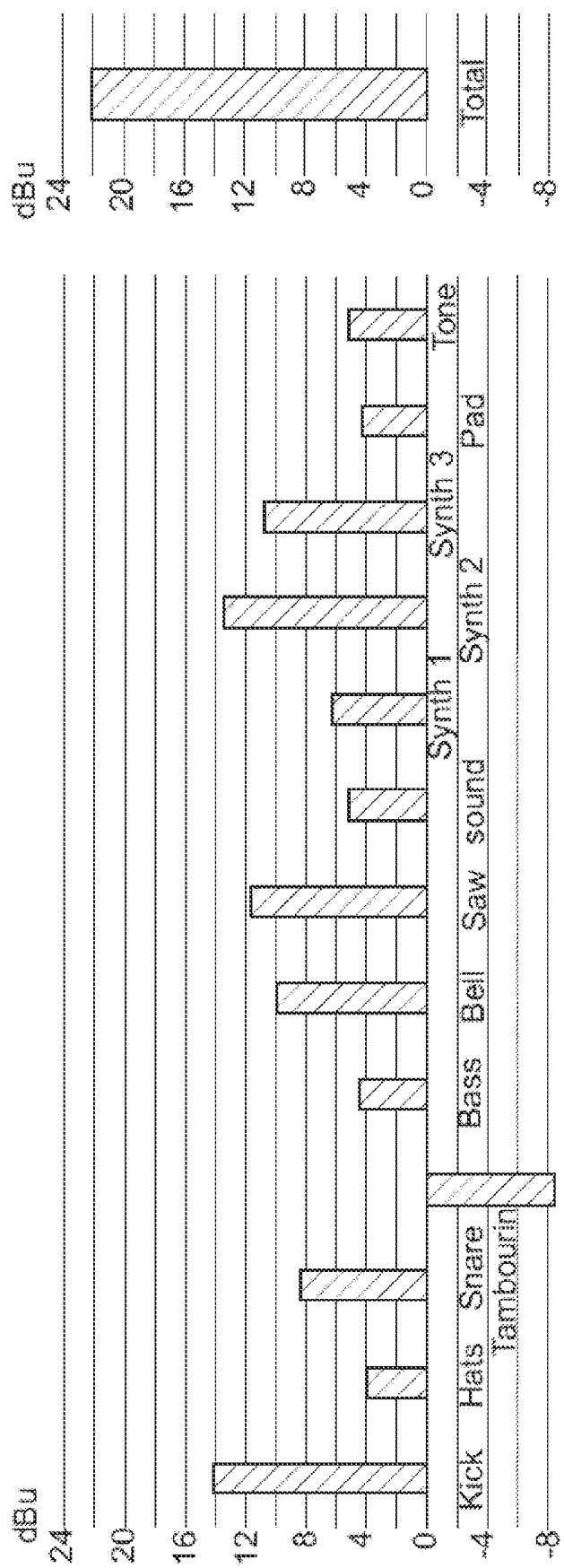
FIGS. 5 and 6 show the amplitude in dBu of various musical instruments (or sound sources)
Figure 6:
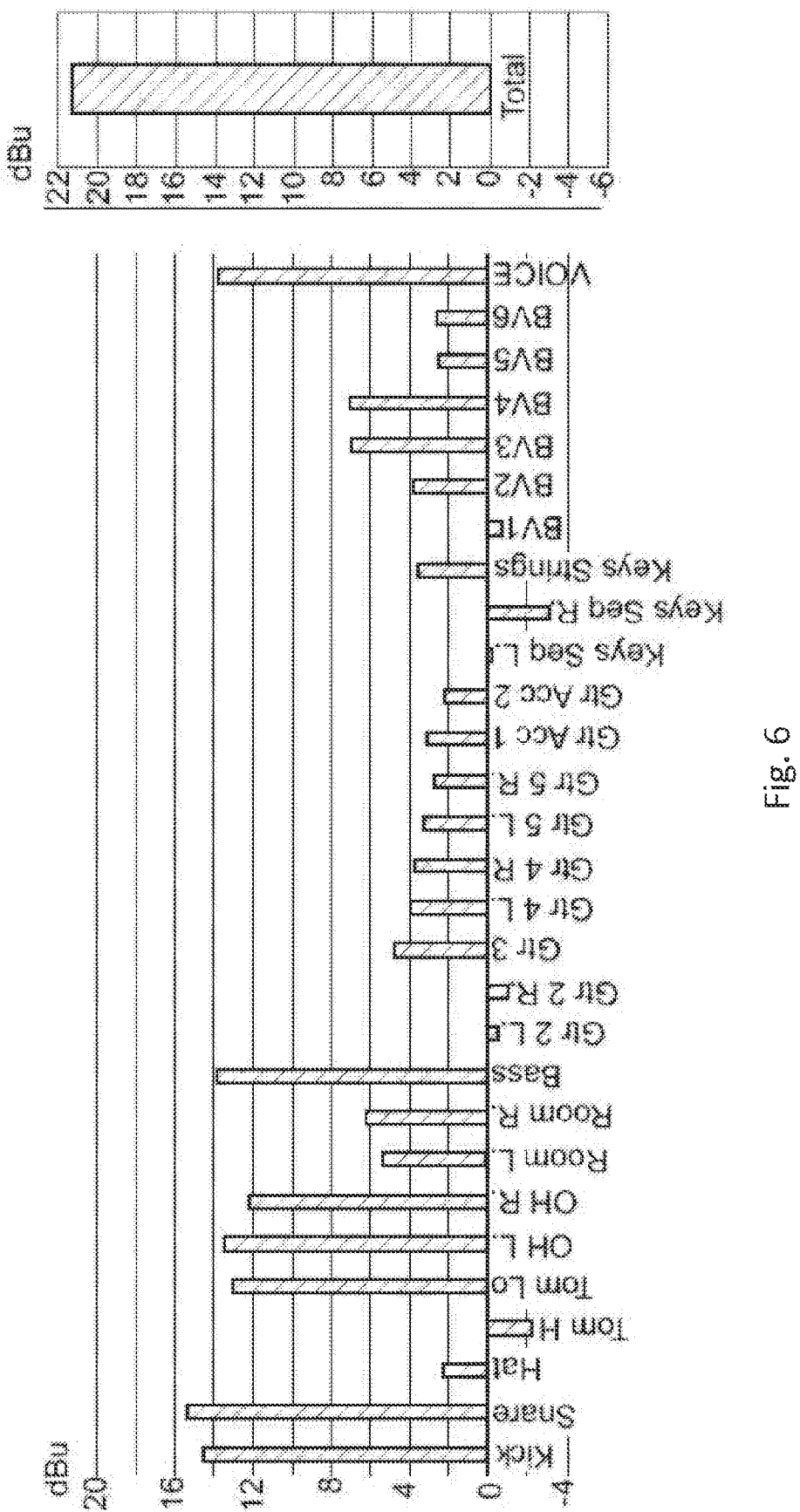

FIGS. 5 and 6 illustrate the amplitude in dBu of some instruments, that is to say the amplitude of the sounds associated with such instruments before the spatialization step (i.e. before creation of the spatialized audio signals).

It can clearly be seen that some instruments are very largely dominant (>3 dB in relation to the others). The instruments are generally placed at the center and statically. The spatialization techniques used will thus tend to distribute the energy of the instruments predominantly in the audio signals that will be connected to the sound broadcasting devices 100 located in the central area ZC.

Figure 7:
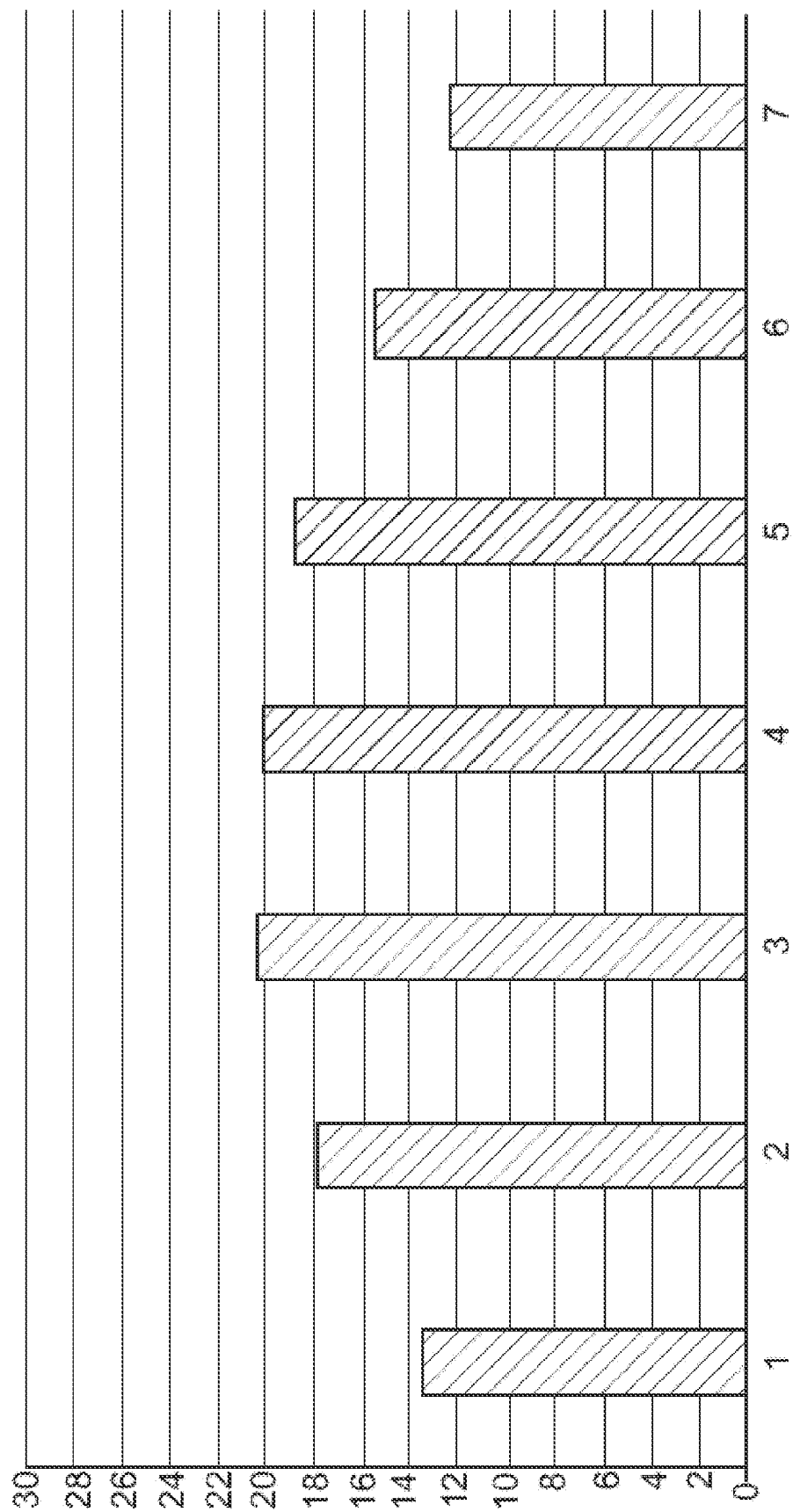
FIG. 7 shows the distribution of the energy in dBu of seven spatialized audio signals.

FIG. 7 illustrates the distribution of the energy in dBu on the sound broadcasting devices 100 of a spatial arrangement 1000 here consisting of seven sound broadcasting devices 100 (that is to say N=7) that receive a spatialized sound signal comprising N mutually distinct audio signals, each sound broadcasting device 100 being connected to an audio signal. As previously stated, for obvious reasons of space, of installation and of cost, it is very rare to have a sound broadcasting device for each different musical instrument/audio source which is in addition suspended just above the instrument/the audio source. Thus, as indicated in the definitions, an entire sound creation process exists upstream of the public broadcasting of a concert depending, among other things, on the number and on the position of the devices for picking up the sound and on the number and on the position/on the arrangement of the sound broadcasting devices in relation to the stage 1.

In the aim of replacing a stereo arrangement 10 comprising a first vertical stack 3 of M loudspeaker enclosures to the left of the stage 1 and a second vertical stack 3 of M loudspeaker enclosures 3 to the right of the stage 1 identical to the first stack 3, M being an integer greater than or equal to 1, it is advantageous that the spatial arrangement 1000 comprises X sound broadcasting devices 100 of the first type A in the central area ZC such that the sound broadcasting devices 100 of the first type A comprise a quantity less than or equal to 2M/X loudspeaker enclosures, X being an integer greater than or equal to 2.

If in addition the stereo arrangement 10 comprises two identical sets 4 each comprising Y sub-bass loudspeaker enclosures 4, one of the sets 4 being arranged to the left of the stage and the other set 4 to the right, Y being an integer greater than or equal to 1, the spatial arrangement 1000 may further comprise a number less than or equal to 2Y of sub-bass loudspeaker enclosures in order to constitute the sound broadcasting devices 100 of the third type C.

Figure 8A:
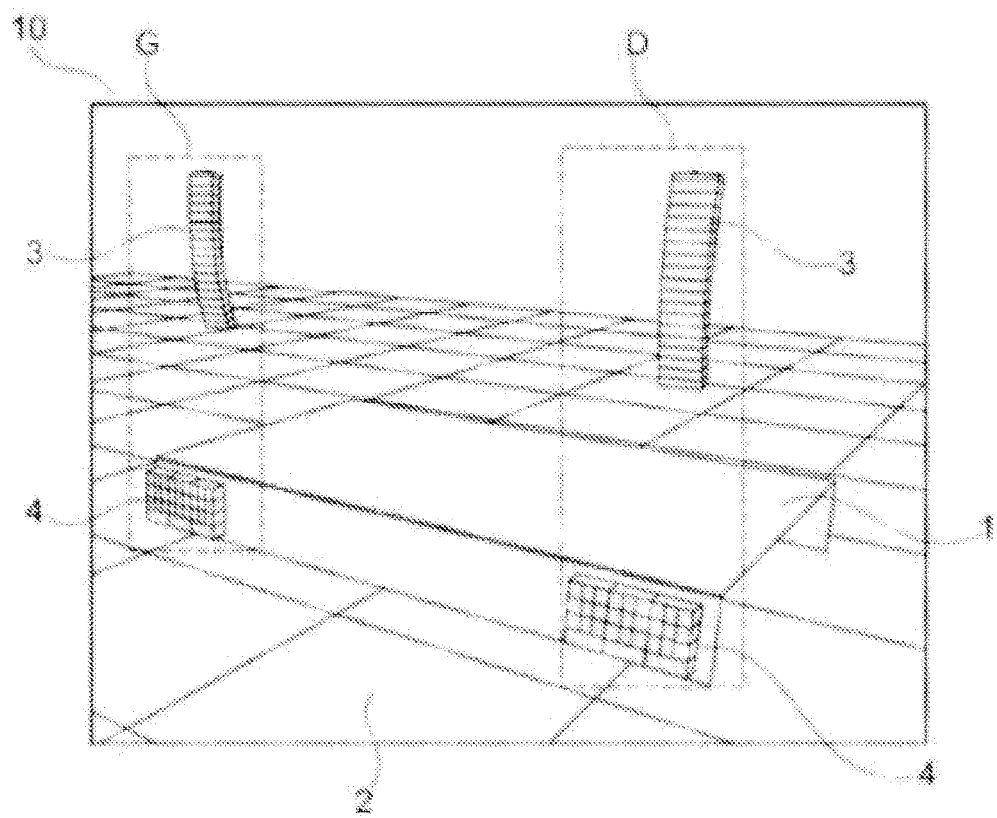

To illustrate the two cases, FIG. 8a shows a conventional stereo arrangement 10. The stereo arrangement 10 comprises M=18 loudspeaker enclosures stacked vertically to the left G and M=18 loudspeaker enclosures stacked vertically to the right D. In addition, the stereo arrangement 10 also comprises 2Y=24 sub-bass loudspeaker enclosures arranged equally to the left G and to the right D, on the floor, below the vertical stacks 3 of loudspeaker enclosures.

Figure 8B:
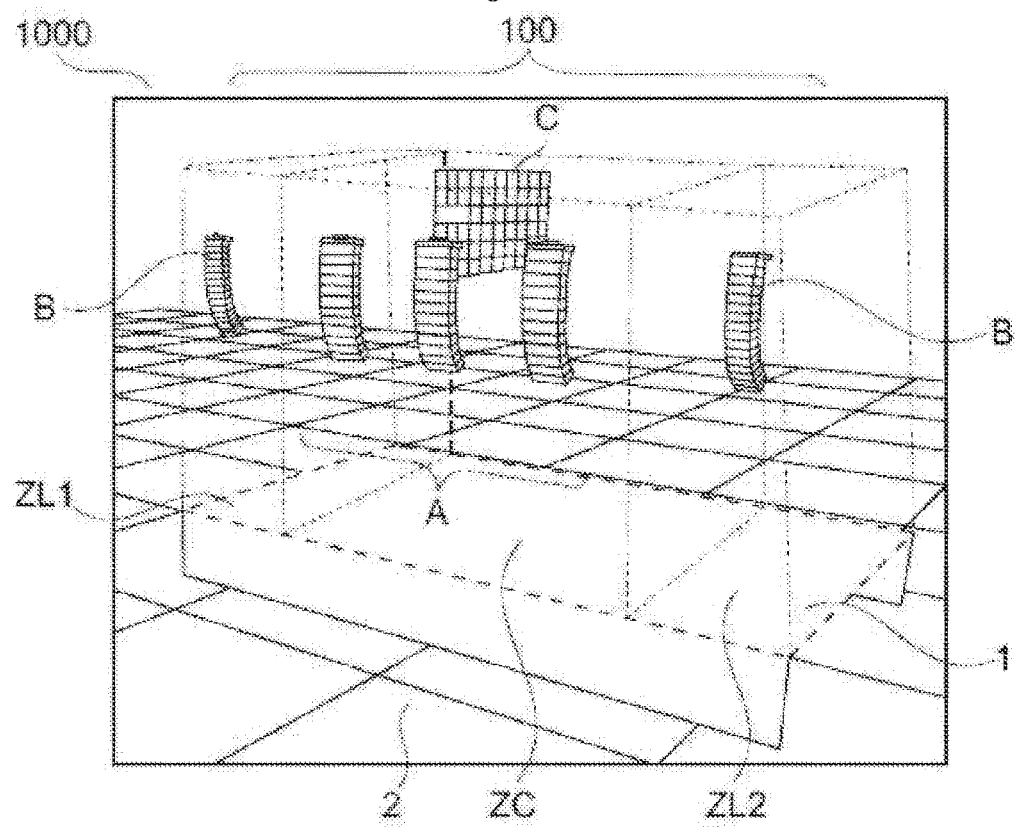

A fourth embodiment of the invention for replacing the stereo arrangement 10 is presented in FIG. 8b. Therein, the spatial arrangement 1000 comprises X=3 sound broadcasting devices 100 of first type A, each consisting of 12 loudspeaker enclosures (i.e. case where the quantity of enclosures is equal to 2M/X). In addition, the spatial arrangement 1000 also comprises 24 sub-bass loudspeaker enclosures (i.e. case where the number of sub-bass enclosures is equal to 2Y) constituting four sound broadcasting devices of the third type C. The sound broadcasting devices 100 of the third type C are arranged in the central area ZC, above the stage at the rear of the broadcasting devices of the first type A. Finally, the spatial arrangement 1000 also comprises two sound broadcasting devices of second type B located in the lateral areas ZL1 and ZL2.

Figure 9A:
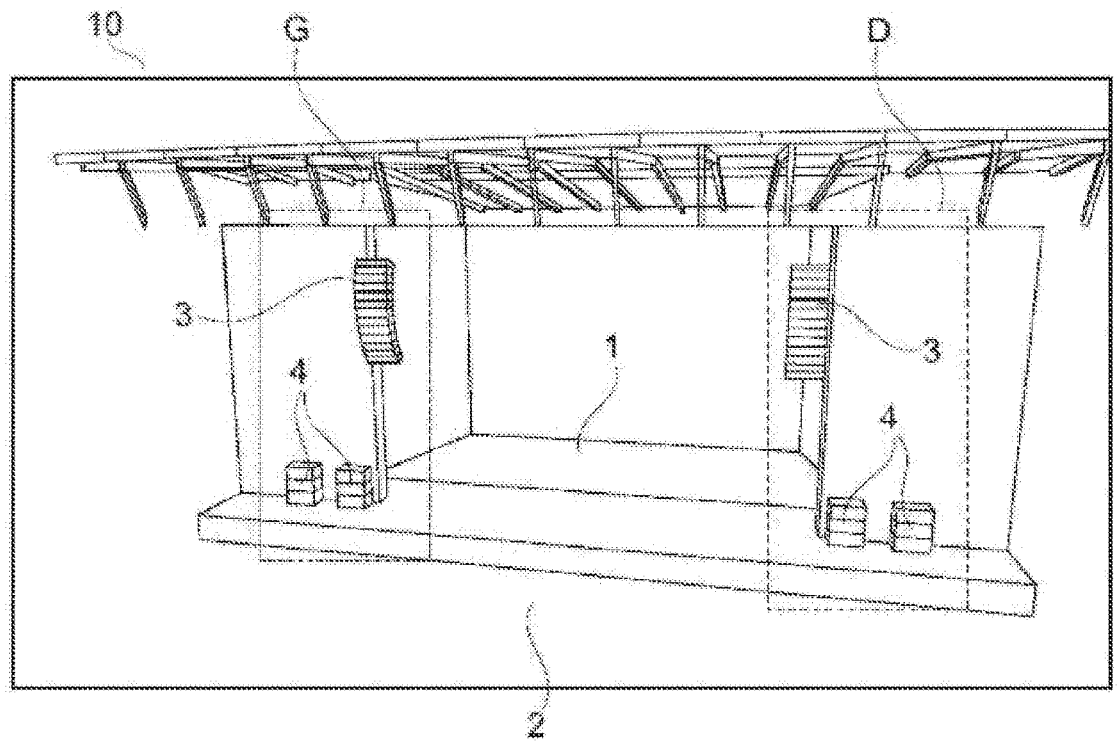

In the same manner as previously, FIG. 9a shows a conventional stereo arrangement 10. The stereo arrangement 10 comprises two vertical stacks 3 of M=12 loudspeaker enclosures arranged to the left G and to the right D of the stage 1, as well as two identical sets 4 of Y=6 sub-bass loudspeaker enclosures arranged to the left G and to the right D, on the floor, below the vertical stacks 3 of loudspeaker enclosures.

Figure 9B:
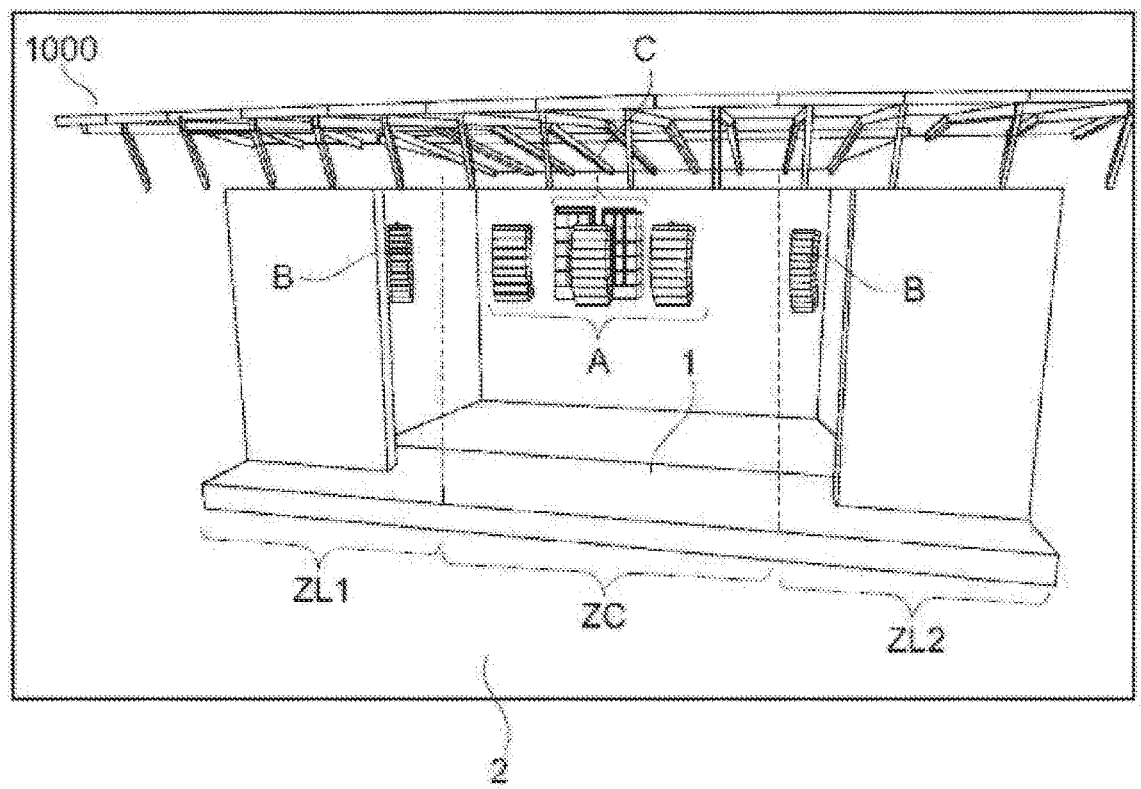

FIG. 9b shows an alternative of the fourth embodiment of the invention for replacing the stereo arrangement 10 of FIG. 9a. Therein, the spatial arrangement 1000 comprises X=3 sound broadcasting devices 100 of type A in the central area ZC of the stage 1, each consisting, in the example, of 2M/X=8 loudspeaker enclosures. The lateral areas ZL1 and ZL2 each comprise a sound broadcasting device of the second type B and here consisting of 12 loudspeaker enclosures. Finally, the spatial arrangement 1000 also comprises 12 sub-bass loudspeaker enclosures consisting of two sound broadcasting devices of the third type C. The sound broadcasting devices 100 of the third type C are arranged in the central area ZC, above the stage and at the rear of the broadcasting devices of the first type A.

Figure 10:
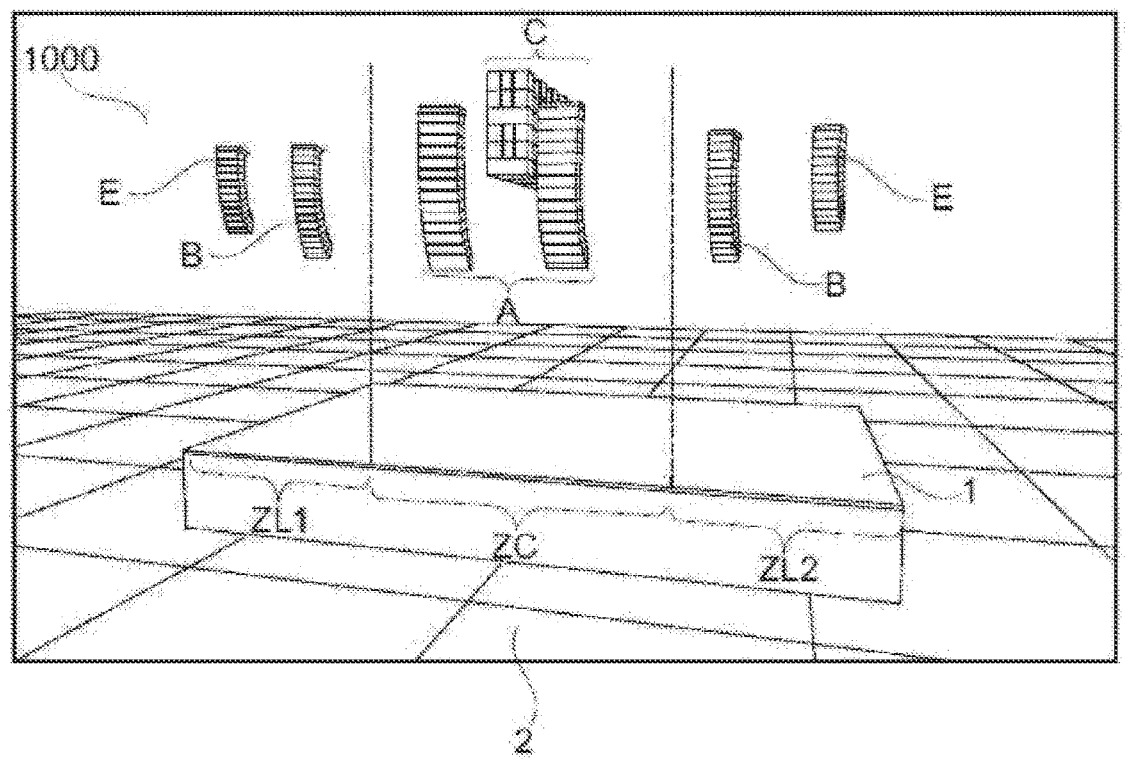
FIGS. 10 and 11 show spatial arrangements according to a fifth and a sixth embodiment of the invention.

FIG. 10 shows a fifth embodiment of the invention.

In the new spatial arrangement 1000, only two sound broadcasting devices 100 of the first type A are arranged in the central area ZC of the stage 1. As for the lateral areas ZL1 and ZL2, each comprises a sound broadcasting device 100 of the second type B as well as a sound broadcasting device of a fourth type E.

The fourth type E of sound broadcasting devices is in general of lower power and broadcasts fewer bass sounds than the sound broadcasting devices of the second type B. Indeed, the musical instruments being rather concentrated at the center of the stage 1, the greater the distance from the center of the stage 1 the less the sound broadcasting devices 100 need to be powerful and/or dimensioned to broadcast bass sounds.

Figure 11:
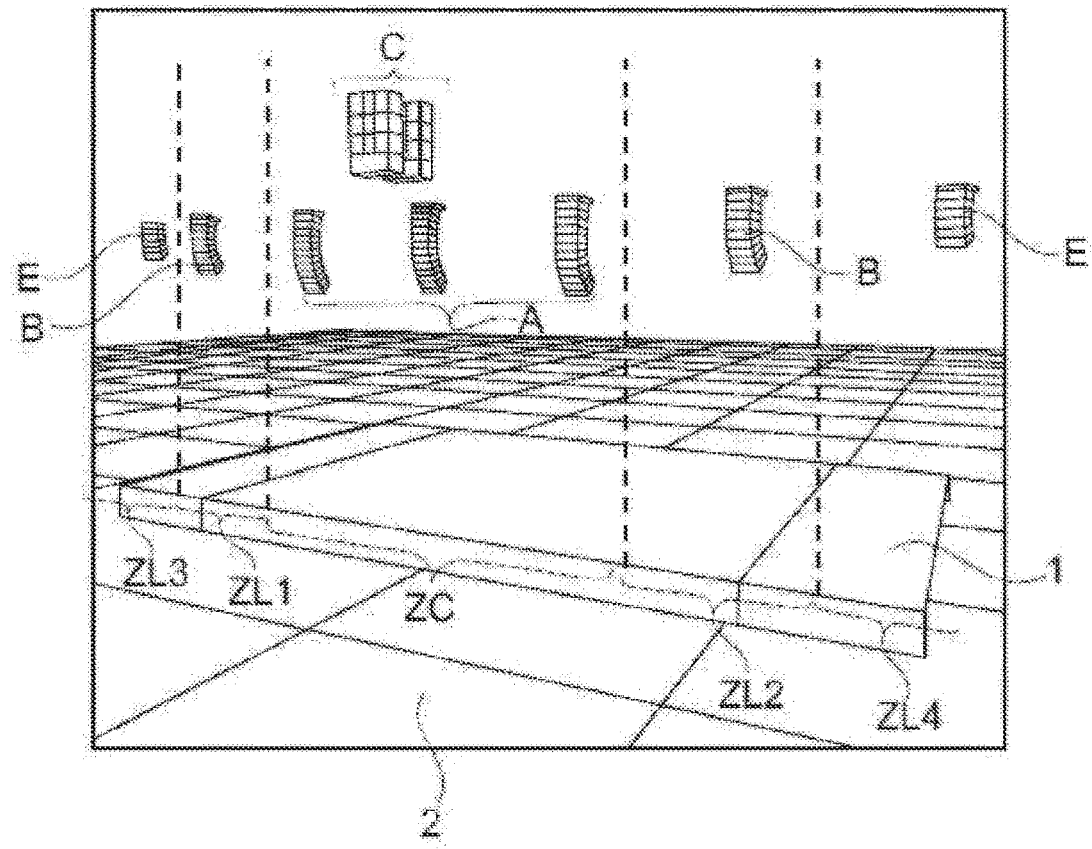

According to a sixth embodiment of the invention presented in FIG. 11, two additional lateral areas ZL3 and ZL4 are defined wherein are positioned the broadcasting devices of the fourth type E.

In this present case, the spatial arrangement 1000 comprises three sound broadcasting devices of the first type A in the central area ZC as well as two sound broadcasting devices of the third type C located this time at the front of the sound broadcasting devices of the first type A. Finally, as in the previous FIG., the first and the second lateral areas ZL1 and ZL2 each comprise a sound broadcasting device of the second type B.

According to the sixth embodiment, the distribution of the energy in dBu of seven spatialized audio signals presented previously in FIG. 7 may absolutely be applicable. Thus, the audio signals numbered from 3 to 5 in FIG. 7 would be connected to the sound broadcasting devices of the first type A, same numbered 2 and 6 would be connected to the sound broadcasting devices of the second type B and same numbered 1 and 7 would be connected to the sound broadcasting devices of the fourth type E.

One embodiment of the invention relates in a second phase to a method for determining an optimized spatial arrangement 1000 of sound broadcasting devices 100 for a stage 1, as previously described, in order to replace a stereo arrangement 10.

Figure 12A:
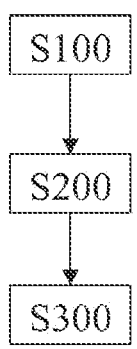
FIGS. 12a to 12c show various synoptics of a method for determining a spatial arrangement according to the invention in the aim of replacing a stereo arrangement.
Figure 12B:
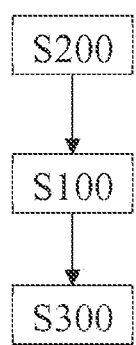
Figure 12C:
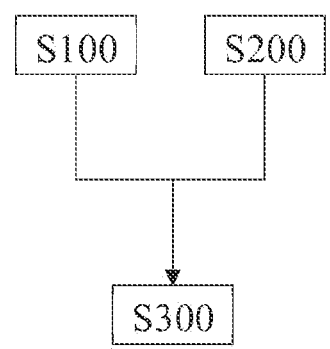

In the case where the stereo arrangement 10 comprises a first vertical stack 3 of M loudspeaker enclosures to the left of the stage and a second vertical stack 3 of M loudspeaker enclosures to the right of the stage identical to the first stack 3, M being an integer greater than or equal to 1, and where the optimized spatial arrangement 1000 comprises N sound broadcasting devices 100, the spatial arrangement 1000 being capable of broadcasting a spatialized sound signal, the spatialized sound signal comprising N mutually distinct audio signals (i.e. different in relation to the audio information that same contain), N being an integer strictly greater than 3, the spatialized sound signal being from a sound creation process produced upstream of the broadcasting, each sound broadcasting device 100 receiving an audio signal, the sound broadcasting devices 100 being capable of amplifying and broadcasting the audio signals, the method mainly comprises three steps, as illustrated in FIGS. 12a to 12c.

The first step S100 is a step of selection wherein the sound broadcasting devices 100 are selected so as to have at least two different types A and B due to the acoustic features thereof in particular due to the intrinsic maximum sound power thereof;

The second step S200 is a step of division of the entire width of the stage 1 wherein it is defined at least one central area ZC, and at least two lateral areas ZL1, ZL2.

As illustrated in FIGS. 12a to 12c, the steps S100 and S200 may be successive or else take place in parallel, same being independent from one another.

The third step S300 is a step of installation of the sound broadcasting devices 100 wherein a number X of sound broadcasting devices of the first type A are arranged in the central area ZC. The sound broadcasting devices 100 of the first type A comprise a quantity less than or equal to 2M/X loudspeaker enclosures, X being an integer greater than or equal to 2. In addition, a number N-X of sound broadcasting devices 100 of the second type B are arranged in the lateral areas ZL1 and ZL2.

When the stereo arrangement 10 also comprises two identical sets 4 each comprising Y sub-bass loudspeaker enclosures, one of the sets 4 being arranged to the left of the stage 1 and the other set 4 to the right, Y being an integer greater than or equal to 1, the method is thus modified:

during the step of selection S100, the sound broadcasting devices 100 are selected so as to also have a third type C different from the first and from the second type A and B due to the acoustic features thereof; and during the step of installation S300 of the sound broadcasting devices 100, a number less than or equal to 2Y of sub-bass loudspeaker enclosures are arranged in the central area ZC in order to constitute the sound broadcasting devices of the third type C are arranged in the central area ZC.

LISTS OF REFERENCES 1 stage
2 audience
3 stack of loudspeaker enclosures
4 set of sub-bass enclosures
5 perpendicular bisector
10 stereo arrangement
100 sound broadcasting device
1000 spatial arrangement according to the invention
A sound broadcasting device of type A
B sound broadcasting device of type B
C sound broadcasting device of type C
D right broadcasting point
E sound broadcasting device of type E
G left broadcasting point
L Width of the stage
SPL Sound Pressure Level
ZBS "Good" Spatialization Area
ZC central area
ZFS "Poor" Spatialization Area
ZL1 lateral area 1
ZL2 lateral area 2
ZL3 lateral area 3
ZL4 lateral area 4
ZMS "Average" Spatialization Area

The invention claimed is:

1. A multichannel public address system comprising a spatial arrangement of sound broadcasting devices for a stage, the spatial arrangement being adapted to broadcasting a spatialized sound signal,
the spatialized sound signal comprising N mutually distinct audio signals, each of said N mutually distinct audio signals containing different audio information, and N being an integer strictly greater than 3,
the spatial arrangement comprising a set of N sound broadcasting devices,
each one of said broadcasting device comprising one or more loudspeaker enclosures,
each sound broadcasting device receiving one of said N mutually distinct audio signals,
said set of N sound broadcasting devices being predominantly distributed over the entire width of the stage and providing a common coverage area for the multichannel public address system,
the sound broadcasting devices being adapted to amplifying and broadcasting the audio signals,
wherein each sound broadcasting device is specifically adapted to reproducing and preserve the characteristics of the distinct audio signal received, said characteristics comprising sound frequency bands, and the sound intensity of the frequency bands of the audio signal,
wherein the sound broadcasting devices are at least of two different types (A, B) due to the sound acoustic features of the said different types of broadcasting devices,
and wherein said stage comprises at least one central area and at least two lateral areas, the central area comprising at least two sound broadcasting devices of a first type (A) and each of the lateral areas comprising at least one sound broadcasting device of a second type (B),
the sound broadcasting devices of the second type (B) are adapted to deliver an intensity of intrinsic maximum sound power less than or equal to the intensity of the sound broadcasting devices of the first type (A) in the medium/high frequency bands.

2. A multichannel public address system according to claim 1 wherein the sound broadcasting devices are globally aligned with the edge of the stage and located above the stage.

3. A multichannel public address system according to claim 1 wherein the spatial arrangement further comprises a third type (C) of sound broadcasting devices, said third type (C) of sound broadcasting devices adapted to broadcast the basses and infra-basses of the sounds transmitted by the audio signal or the audio signals received by the broadcasting devices of the third type (C).

4. A multichannel public address system according to claim 3 wherein the broadcasting devices of the third type (C) are located in the central area.

5. A multichannel public address system according to claim 3 comprising X sound broadcasting devices of the first type (A) in the central area comprising a quantity less than or equal to 2M/X loudspeaker enclosures, X being an integer greater than or equal to 2, as well as a number less than or equal to 2Y of sub-bass loudspeaker enclosures in order to constitute the sound broadcasting devices of the third type (C) in the aim of replacing a stereo arrangement comprising a first vertical stack of M loudspeaker enclosures to the left of the stage and, a second vertical stack of M loudspeaker enclosures to the right of the stage identical to the first stack and two identical sets each comprising Y sub-bass loudspeaker enclosures, one of the sets being arranged to the left of the stage and the other set to the right, M and Y being two integers greater than or equal to 1.

6. A multichannel public address system according to claim 1 comprising X sound broadcasting devices of the first type (A) in the central area comprising a quantity less than or equal to 2M/X loudspeaker enclosures, X being an integer greater than or equal to 2, in the aim of replacing a stereo arrangement comprising a first vertical stack of M loudspeaker enclosures to the left of the stage and a second vertical stack M loudspeaker enclosures to the right of the stage identical to the first stack, M being an integer greater than or equal to 1.

7. A multichannel public address system according to claim 1 wherein, among the said acoustic sound features of the said different types of broadcasting devices, the sound broadcasting device of the second type (B) has the same benefit as the sound broadcasting device of the first type (A) above 300 Hz, 8 dB of less than 100 Hz and 22 dB of less than 50 Hz.

8. A multichannel public address system comprising a spatial arrangement of sound broadcasting devices for a stage, the spatial arrangement being adapted to broadcasting a spatialized sound signal,
the spatialized sound signal comprising N mutually distinct audio signals, each of said N mutually distinct audio signals containing different audio information, and N being an integer strictly greater than 3, the spatial arrangement comprising a set of N sound broadcasting devices, each one of said broadcasting device comprising one or more loudspeaker enclosures, each sound broadcasting device receiving one of said N mutually distinct audio signals, said set of N sound broadcasting devices being predominantly distributed over the entire width of the stage and providing a common coverage area for the multichannel public address system, the sound broadcasting devices being adapted to amplifying and broadcasting the audio signals, wherein each sound broadcasting device is specifically adapted to reproducing and preserve the characteristics of the distinct audio signal received, said characteristics comprising sound frequency bands, and the sound intensity of the frequency bands of the audio signal, wherein the sound broadcasting devices are at least of two different types (A, B) due to the sound acoustic features of the said different types of broadcasting devices, and wherein said stage comprises at least one central area and at least two lateral areas, the central area comprising at least two sound broadcasting devices of a first type (A) and each of the lateral areas comprising at least one sound broadcasting device of a second type (B), wherein the sound broadcasting devices of the second type (B) deliver an intrinsic maximum sound power less than or equal to at least 2 dB in relation to the maximum sound power of the sound broadcasting devices of the first type (A) in the band of low frequencies.

9. A multichannel public address system according to claim 8 wherein the sound broadcasting devices are globally aligned with the edge of the stage and located above the stage.

10. A multichannel public address system according to claim 9 wherein the spatial arrangement further comprises a third type (C) of sound broadcasting devices, said third type (C) of sound broadcasting devices adapted to broadcast the basses and infra-basses of the sounds transmitted by the audio signal or the audio signals received by the broadcasting devices of the third type (C).

11. A multichannel public address system according to claim 10 wherein the broadcasting devices of the third type (C) are located in the central area.

12. A multichannel public address system according to claim 10 comprising X sound broadcasting devices of the first type (A) in the central area comprising a quantity less than or equal to 2M/X loudspeaker enclosures, X being an integer greater than or equal to 2, as well as a number less than or equal to 2Y of sub-bass loudspeaker enclosures in order to constitute the sound broadcasting devices of the third type (C) in the aim of replacing a stereo arrangement comprising a first vertical stack of M loudspeaker enclosures to the left of the stage and, a second vertical stack of M loudspeaker enclosures to the right of the stage identical to the first stack and two identical sets each comprising Y sub-bass loudspeaker enclosures, one of the sets being arranged to the left of the stage and the other set to the right, M and Y being two integers greater than or equal to 1.

13. A multichannel public address system according to claim 8 comprising X sound broadcasting devices of the first type (A) in the central area comprising a quantity less than or equal to 2M/X loudspeaker enclosures, X being an integer greater than or equal to 2, in the aim of replacing a stereo arrangement comprising a first vertical stack of M loudspeaker enclosures to the left of the stage and a second vertical stack M loudspeaker enclosures to the right of the stage identical to the first stack, M being an integer greater than or equal to 1.

14. Method for determining an optimized spatial arrangement of sound broadcasting devices for a stage of a multichannel public address system in order to replace a stereo arrangement, the stereo arrangement comprising a first vertical stack of M loudspeaker enclosures to the left of the stage and a second vertical stack of M loudspeaker enclosures to the right of the stage identical to the first stack, M being an integer greater than or equal to 1, the optimized spatial arrangement comprising N sound broadcasting devices, and the spatial arrangement being adapted to broadcasting a spatialized sound signal, the spatialized sound signal comprising N mutually distinct audio signals, each of said N mutually distinct audio signals containing different information, N being an integer strictly greater than 3, the spatialized sound signal being from a sound creation process produced upstream of the broadcasting, each sound broadcasting device receiving an audio signal, each sound broadcasting device comprising one or more loudspeakers enclosures, each sound broadcasting device receiving one of said N mutually distinct audio signals, said set of N sound broadcasting devices being predominately distributed over the entire width of the stage and providing a common coverage area for the multichannel public address system, the sound broadcasting devices being adapted to amplifying and broadcasting the audio signal, the method comprising:

a step of selection wherein the sound broadcasting devices are selected so as to have at least two different types (A, B) due to the sound acoustic features of the said different types of broadcasting devices;

a step of division of the entire width of the said stage wherein it is defined at least one central area, and at least two lateral areas;

a step of installation of the sound broadcasting devices wherein a number X of sound broadcasting devices of the first type (A) are arranged in the central area comprising a quantity less than or equal to 2M/X loudspeaker enclosures, X being an integer greater than or equal to 2, and wherein a number N-X of sound broadcasting devices of the second type (B) are arranged in the lateral areas, and wherein the sound broadcasting device of the second type (B) deliver an intrinsic maximum sound power less than or equal to the intrinsic maximum sound power of the sound broadcasting devices of the first type (A) in the medium/high frequency bands and/or the sound broadcasting devices of the second type (B) deliver an intrinsic maximum sound power less than or equal to at least 2 dB in relation to the intrinsic maximum sound power of the sound broadcasting devices of the first type (A) in the band of low frequencies.

15. Method according to claim 14, wherein:

when the stereo arrangement also comprises two identical sets each comprising Y sub-bass loudspeaker enclosures, one of the sets being arranged to the left of the stage and the other set to the right, Y being an integer greater than or equal to 1, during the step of selection, the sound broadcasting devices are selected so as to also have a third type (C) different from the first and from the second type (A, B) due to the acoustic sound features of the said different types of broadcasting devices; and during the step of installation of the sound broadcasting devices, a number less than or equal to 2Y of sub-bass loudspeaker enclosures in order to constitute the sound broadcasting devices of the third type (C) are arranged in the central area of the said stage.

\* \* \* \* \*